(12) United States Patent
French (10) Patent No.: US 11,584,174 B2
(45) Date of Patent: Feb. 21, 2023

(54) FASTENER MIGRATION LIMITING FEATURE

(71) Applicant: GOODRICH CORPORATION, Charlotte, NC (US)

(72) Inventor: Robert French, Beavercreek, OH (US)

(73) Assignee: Goodrich Corporation, Charlotte, NC (US)

(*) Notice: Subject to any disclaimer, the term of this patent is extended or adjusted under 35 U.S.C. 154(b) by 526 days.

(21) Appl. No.: 16/727,644

(22) Filed: Dec. 26, 2019

(65) Prior Publication Data
US 2021/0197633 A1 Jul. 1, 2021

(51) Int. Cl.
| | | |
|---|---|---|
| *B64C 25/42* | (2006.01) | |
| *F16D 65/00* | (2006.01) | |
| *F16B 5/06* | (2006.01) | |
| *B60C 23/18* | (2006.01) | |
| *F16B 5/00* | (2006.01) | |
| *F16D 65/78* | (2006.01) | |

(52) U.S. Cl.
CPC .............. *B60C 23/18* (2013.01); *B64C 25/42* (2013.01); *F16B 5/004* (2013.01); *F16B 5/0084* (2013.01); *F16B 5/0635* (2013.01); *F16D 65/0081* (2013.01); *F16D 2065/785* (2013.01)

(58) Field of Classification Search
CPC .................. B64C 25/42; F16D 65/0081; F16D 2065/785; F16B 5/0032; F16B 5/004; F16B 5/0052; F16B 5/0084; F16B 5/06; F16B 5/0607; F16B 5/0621; F16B 5/0635; F16B 2005/0678; E04B 2/761

USPC ................. 403/359.1, 359.3, 359.6
See application file for complete search history.

(56) References Cited

U.S. PATENT DOCUMENTS

| | | | | |
|---|---|---|---|---|
| 1,601,180 A | * | 9/1926 | Lindgren | B65D 7/32 220/684 |
| 2,224,903 A | * | 12/1940 | Dover | A47H 1/022 16/95 D |
| 4,084,857 A | | 4/1978 | VanderVeen | |

(Continued)

FOREIGN PATENT DOCUMENTS

| | | | | |
|---|---|---|---|---|
| DE | 102006020259 A1 | * | 11/2006 | E04B 1/26 |
| EP | 1516754 | | 3/2005 | |

(Continued)

OTHER PUBLICATIONS

European Patent Office; European Search Report dated May 14, 2021 in Application No. 20217244.1.

*Primary Examiner* — Thomas J Williams
(74) *Attorney, Agent, or Firm* — Snell & Wilmer L.L.P.

(57) ABSTRACT

A retaining clip for constraining a heat shield for use with an aircraft wheel assembly. The retaining clip includes a first end and a second end axially opposite the first end, the first end being opposite the second end along a longitudinal axis. The retaining clip further includes a first side and a second side each having a curvature forming a U-shaped cross section such that an outer edge of each of the first side and the second side extends back towards the longitudinal axis. The retaining clip further includes a migration stop defined by the first side at the first end, the migration stop extending past the outer edge of the second side and configured to interface with hooks of the heat shield to resist axial movement of the retaining clip relative to the heat shield.

19 Claims, 7 Drawing Sheets

(56) References Cited

U.S. PATENT DOCUMENTS

| | | | | |
|---|---|---|---|---|
| 5,301,826 | A * | 4/1994 | Sandahl | F16B 5/004 |
| | | | | 220/4.03 |
| 5,594,982 | A | 1/1997 | Dobbeck | |
| 5,692,353 | A * | 12/1997 | Bass | E04C 3/09 |
| | | | | 403/201 |
| 7,546,910 | B2 | 6/2009 | Thorp et al. | |
| 9,908,375 | B2 | 3/2018 | Baden et al. | |
| 10,330,163 | B2 | 6/2019 | French et al. | |
| 11,346,418 | B2 * | 5/2022 | Francis | B64C 25/36 |
| 2020/0189727 | A1 * | 6/2020 | French | B64C 25/42 |
| 2021/0018055 | A1 * | 1/2021 | Miller | F16D 55/36 |

FOREIGN PATENT DOCUMENTS

| | | |
|---|---|---|
| EP | 3480072 | 5/2019 |
| EP | 3670955 | 6/2020 |

\* cited by examiner

FASTENER MIGRATION LIMITING FEATURE

FIELD

The present disclosure is directed to aircraft wheels and, more particularly, to retaining clips used to complete a heat shield assembly for use in aircraft wheels.

BACKGROUND

Some aircraft include one or more landing gear having wheels for supporting the aircraft while the aircraft is not airborne. Many wheels can include a braking system positioned within the wheel to aid in reducing forward velocity of the aircraft during taxi and landing. The braking system can generate relatively large amounts of heat due to the relatively large mass of the aircraft and due to the relatively high velocity of the aircraft upon landing. A heat shield may be positioned between an inner surface of the wheel and the braking system in order to reduce an amount of heat transfer from the braking system to the wheel and a corresponding tire.

SUMMARY

Disclosed herein is a retaining clip for constraining a heat shield for use with an aircraft wheel assembly. The retaining clip includes a first end and a second end axially opposite the first end, the first end being opposite the second end along a longitudinal axis. The retaining clip further includes a first side and a second side each having a curvature forming a U-shaped cross section such that an outer edge of each of the first side and the second side extends back towards the longitudinal axis. The retaining clip further includes a migration stop defined by the first side at the first end, the migration stop extending past the outer edge of the second side and configured to interface with hooks of the heat shield to resist axial movement of the retaining clip relative to the heat shield.

Any of the foregoing embodiments may further include a tab extending from the second end at a direction perpendicular to the longitudinal axis, the tab defining an aperture for receiving a portion of a torque bar.

In any of the foregoing embodiments, the first end is an inboard end and the second end is an outboard end such that the migration stop resists axial movement of the retaining clip relative to the heat shield towards the outboard end.

In any of the foregoing embodiments, interaction between the tab and the portion of the torque bar resists axial movement of the retaining clip relative to the heat shield towards the inboard end.

In any of the foregoing embodiments, the interaction between the tab and the portion of the torque bar as well as the interface between the migration stop and the retaining clip is sufficient to resist axial movement of the retaining clip towards the inboard end and towards the outboard end during normal operation of the aircraft wheel assembly.

In any of the foregoing embodiments, the aircraft wheel assembly has a wheel axis that is parallel to the longitudinal axis of the retaining clip; the curvature of the first side and the second side extends radially outward relative to the wheel axis; and the tab extends radially inward relative to the wheel axis.

In any of the foregoing embodiments, the first side and the second side each have a base portion and an outer portion that includes the outer edge, wherein the outer portion is parallel to the base portion.

In any of the foregoing embodiments, the migration stop is defined by the outer portion of the first side, and the outer portion of the first side further defines a curved slot located between the outer edge of the first side and the migration stop.

In any of the foregoing embodiments, the first side and the second side are each configured to receive U-shaped hooks of the retaining clip between the base portion and the outer portion.

Also disclosed is a retaining clip for retaining a heat shield for use with an aircraft wheel assembly. The retaining clip includes a first end and a second end axially opposite the first end, the first end being opposite the second end along a longitudinal axis. The retaining clip further includes a first side and a second side each having a curvature forming a U-shaped cross section such that an outer edge of each of the first side and the second side extends back towards the longitudinal axis. The retaining clip further includes a migration stop defined by the first side at the first end, the migration stop extending past the outer edge of the second side and configured to interface with the heat shield to resist axial movement of the retaining clip relative to the heat shield towards the second end. The retaining clip further includes a tab extending from the second end at a direction perpendicular to the longitudinal axis, the tab defining an aperture for receiving a portion of a torque bar such that interaction between the tab and the torque bar resists axial movement of the retaining clip relative to the heat shield towards the first end.

In any of the foregoing embodiments, the first end is an inboard end and the second end is an outboard end.

In any of the foregoing embodiments, the interaction between the aperture and the portion of the torque bar as well as the interface between the migration stop and the heat shield is sufficient to resist axial movement of the retaining clip towards the inboard end and towards the outboard end during normal operation of the aircraft wheel assembly.

In any of the foregoing embodiments, the aircraft wheel assembly has a wheel axis that is parallel to the longitudinal axis of the retaining clip; the curvature of the first side and the second side extends radially outward relative to the wheel axis; and the tab extends radially inward relative to the wheel axis.

In any of the foregoing embodiments, the first side and the second side each have a base portion and an outer portion that includes the outer edge, wherein the outer portion is parallel to the base portion.

In any of the foregoing embodiments, the migration stop is defined by the outer portion of the first side, and the outer portion of the first side further defines a curved slot located between the outer edge of the first side and the migration stop.

In any of the foregoing embodiments, the first side and the second side are each configured to receive U-shaped hooks of the heat shield between the base portion and the outer portion.

Also disclosed is a heat shield assembly for use with an aircraft wheel. The heat shield assembly includes a heat shield. The heat shield assembly further includes two detail components coupled to the heat shield and having a pair of U-shaped hooks. The heat shield assembly further includes a retaining clip having: a first end and a second end axially opposite the first end, the first end being opposite the second end along a longitudinal axis; a first side and a second side each having a curvature forming a U-shaped cross section such that an outer edge of each of the first side and the second side extends back towards the longitudinal axis, the first side and the second side interfacing with the pair of U-shaped hooks of the two detail components; and a migration stop defined by the first side at the first end, the migration stop extending past the outer edge of the second side and configured to interface with the pair of U-shaped hooks to resist axial movement of the retaining clip relative to the heat shield.

In any of the foregoing embodiments, the retaining clip further includes a tab extending from the second end at a direction perpendicular to the longitudinal axis, the tab defining an aperture for receiving a portion of a torque bar.

In any of the foregoing embodiments, the first end is an inboard end and the second end is an outboard end such that the migration stop resists axial movement of the retaining clip relative to the heat shield towards the outboard end.

In any of the foregoing embodiments, interaction between the aperture and the portion of the torque bar resists axial movement of the retaining clip relative to the heat shield towards the inboard end.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
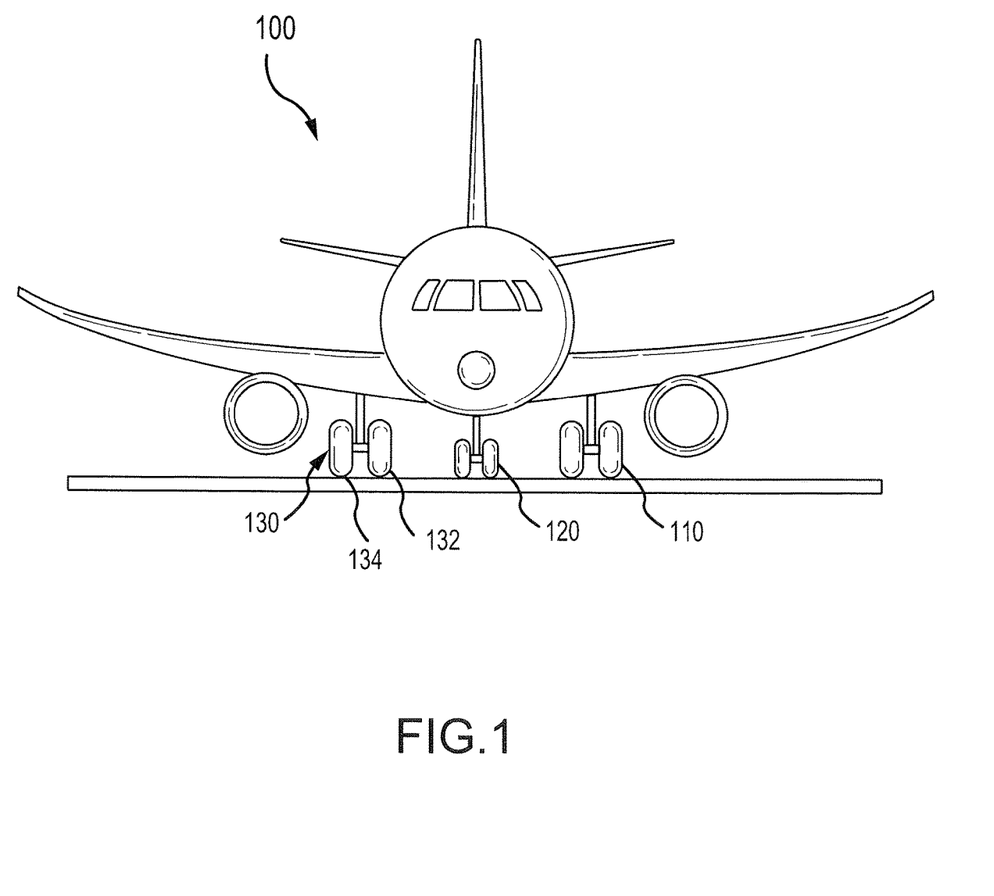
FIG. 1 is a drawing of an aircraft having landing gear, in accordance with various embodiments.

Referring now to FIG. 1, an aircraft 100 in accordance with various embodiments can include multiple landing gear including landing gear 110, landing 120 and landing gear 130. Each landing gear may include one or more wheel assemblies. For example, the landing gear 130 includes an inner wheel assembly 132 and an outer wheel assembly 134. The inner wheel assembly 132 and the outer wheel assembly 134, along with the other wheels of the aircraft 100, can include a disk braking system that provides a braking force to the corresponding wheel. Each braking system can generate a relatively large amount of heat (e.g., resulting in brake temperatures of up to 500 degrees Fahrenheit (500° F., 260 degrees Celsius (260° C.)) due to the relatively high velocity of the aircraft 100 upon landing and due to the relatively large mass of the aircraft 100.

Each wheel of the aircraft 100 can receive a tire. For example, a tire may be placed about an outer circumference of the inner wheel assembly 132 and inflated. It is desirable to prevent the heat from the corresponding braking system to transfer to the wheel and the tire, as the heat may stress the wheel and the tire.

Figure 2A:
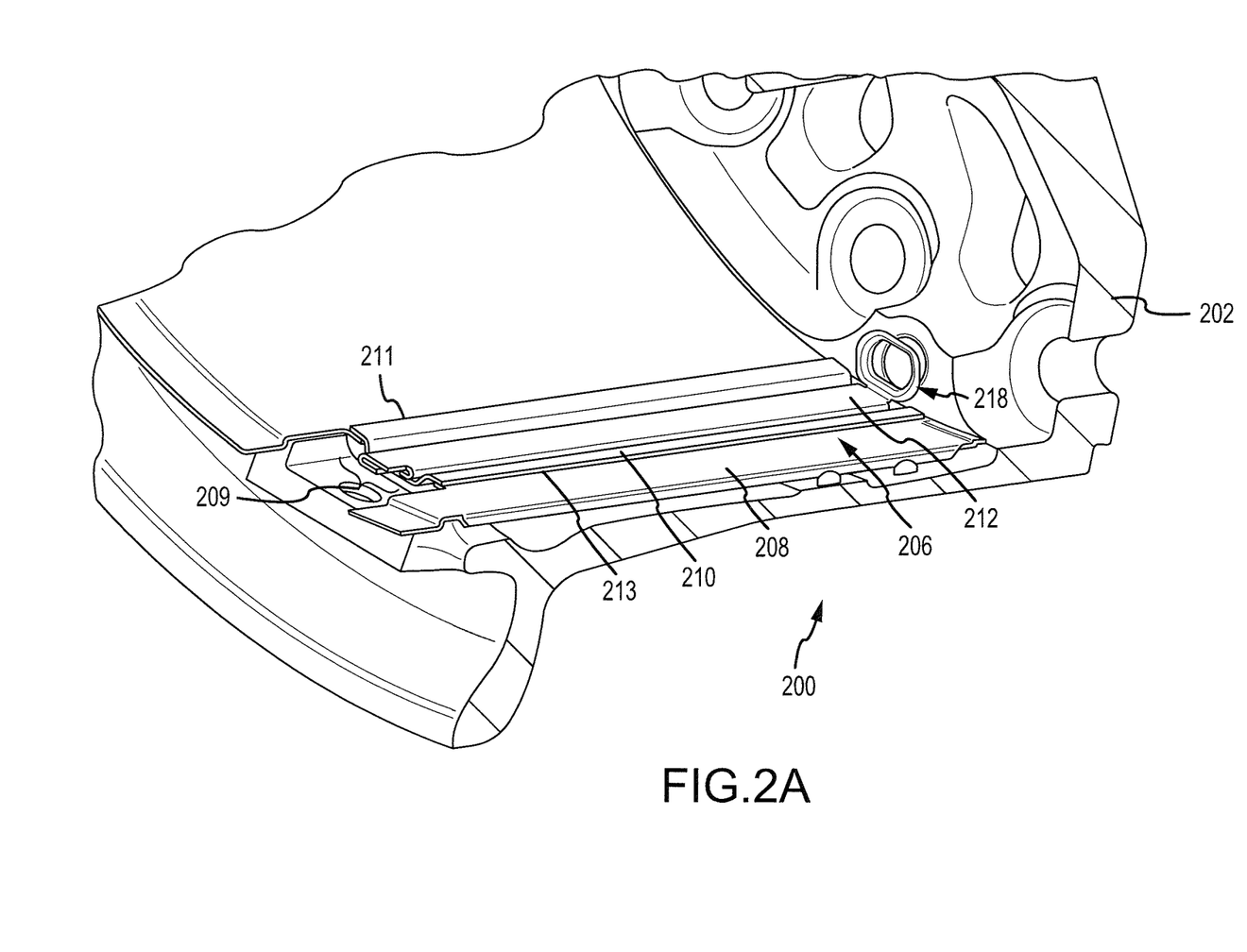
FIG. 2A is an enlarged cross-sectional view of a wheel assembly of an aircraft, in accordance with various embodiments.
Figure 2B:
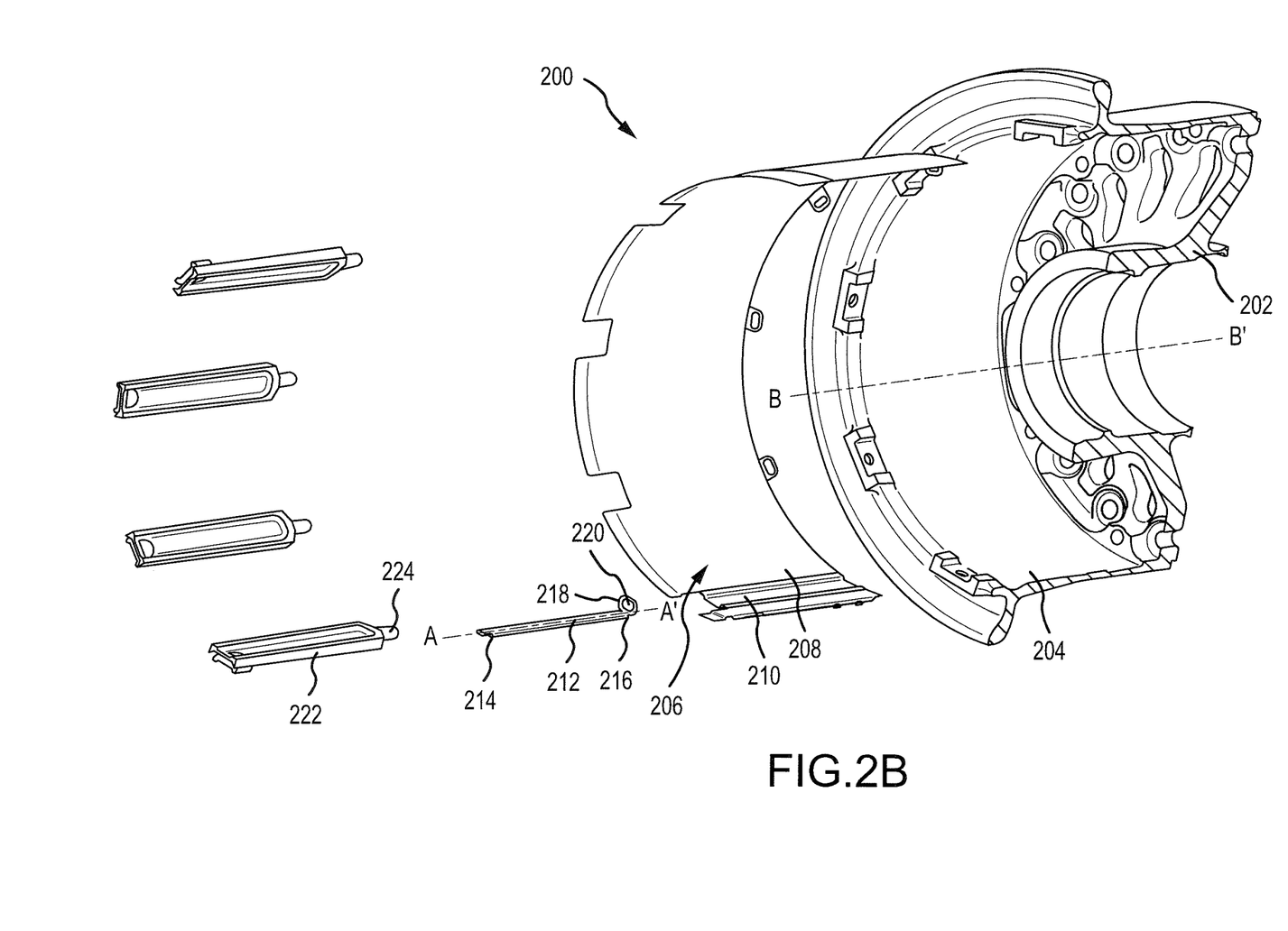
FIG. 2B is an exploded view of the wheel assembly of FIG. 2A, in accordance with various embodiments.

With reference now to FIGS. 2A and 2B, a portion of a wheel assembly 200 is shown. The wheel assembly 200 may be used as any of the wheel assemblies of FIG. 1. The wheel assembly 200 may be designed to rotate about an axis B-B'. The wheel assembly 200 may include a wheel portion 202 having an inner surface 204. The wheel assembly 200 may further include a heat shield assembly 206. The heat shield assembly 206 is designed to be located radially inward from the wheel portion 202 and may protect the inner surface 204 from heat, such as heat generated from a braking system.

The heat shield assembly 206 may include a heat shield 208. The heat shield 208 may be annular except for a single circumferential portion 209. Individual hooks, or hook details, 210 may be coupled to the circumferential ends 211, 213 of the heat shield 208. For example, the hook details 210 may be welded, brazed, or otherwise coupled to the circumferential ends 211, 213 of the heat shield 208 or may be integrally formed features of the circumferential ends 211, 213 without secondary processes.

The heat shield assembly 206 may further include a retaining clip 212. The retaining clip 212 may be designed to fasten the heat shield hooks 210 together. That is, the retaining clip 212, in concert with the hooks 210, may cause the heat shield assembly 206 to be fully annular.

The retaining clip 212 may have a first, or inboard, end 214 and a second, or outboard, end 216. The retaining clip 212 may have a longitudinal axis A-A' extending from the first end 214 to the second end 216. The second end 216 may include a tab 218 extending substantially perpendicular to the axis A-A'. Where used in this context, substantially perpendicular means that tab 218 may form an angle with the axis A-A' that is between 70 degrees and 110 degrees, although other angles may be contemplated and may thus be considered part of this disclosure. The tab 218 may define an aperture 220. An outboard portion 224 of a torque bar 222 may be received by the aperture 220.

During operation of the wheel assembly 200 (e.g., during taxi, takeoff, or landing) the retaining clip 212 may tend to migrate or shift along the axis A-A' relative to the heat shield hooks 210. In that regard, the interface of the tab 218 and the torque bar 222 may resist movement of the retaining clip 212 relative to the heat shield hooks 210 towards the first end 214 (i.e., in the inboard direction).

Figure 3A:
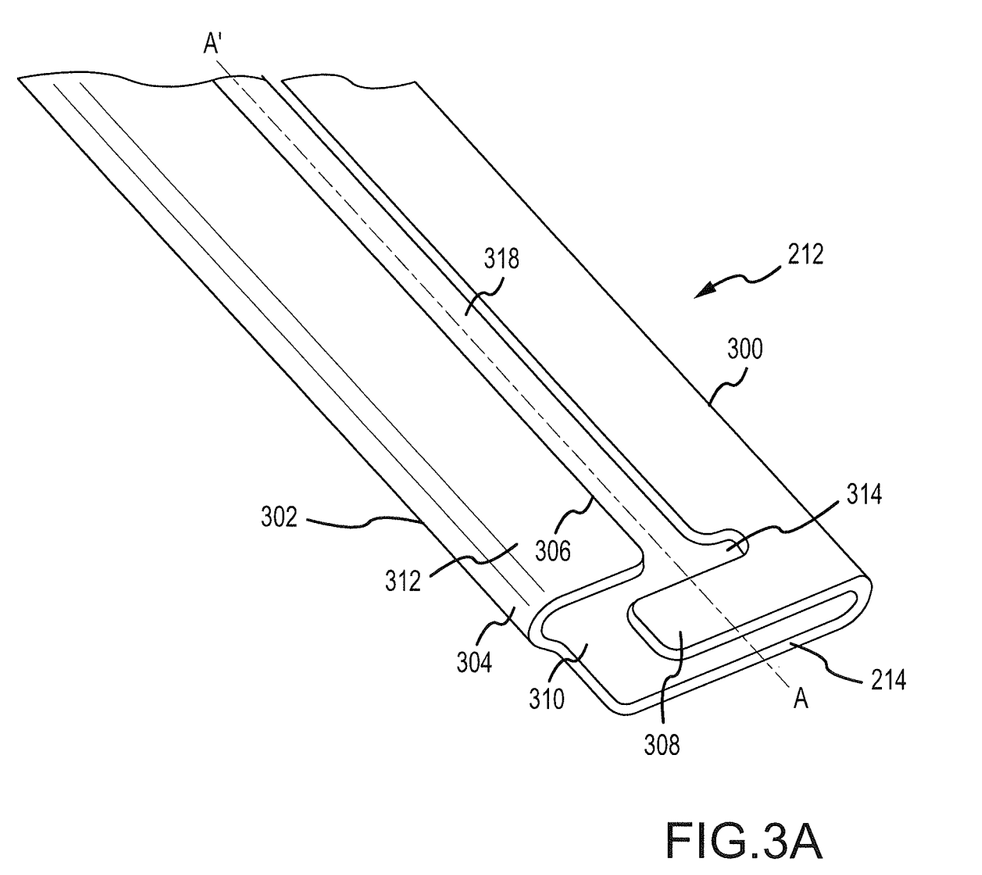
FIG. 3A is a perspective view of a first end of a retaining clip for use in a heat shield assembly, in accordance with various embodiments.
Figure 3B:
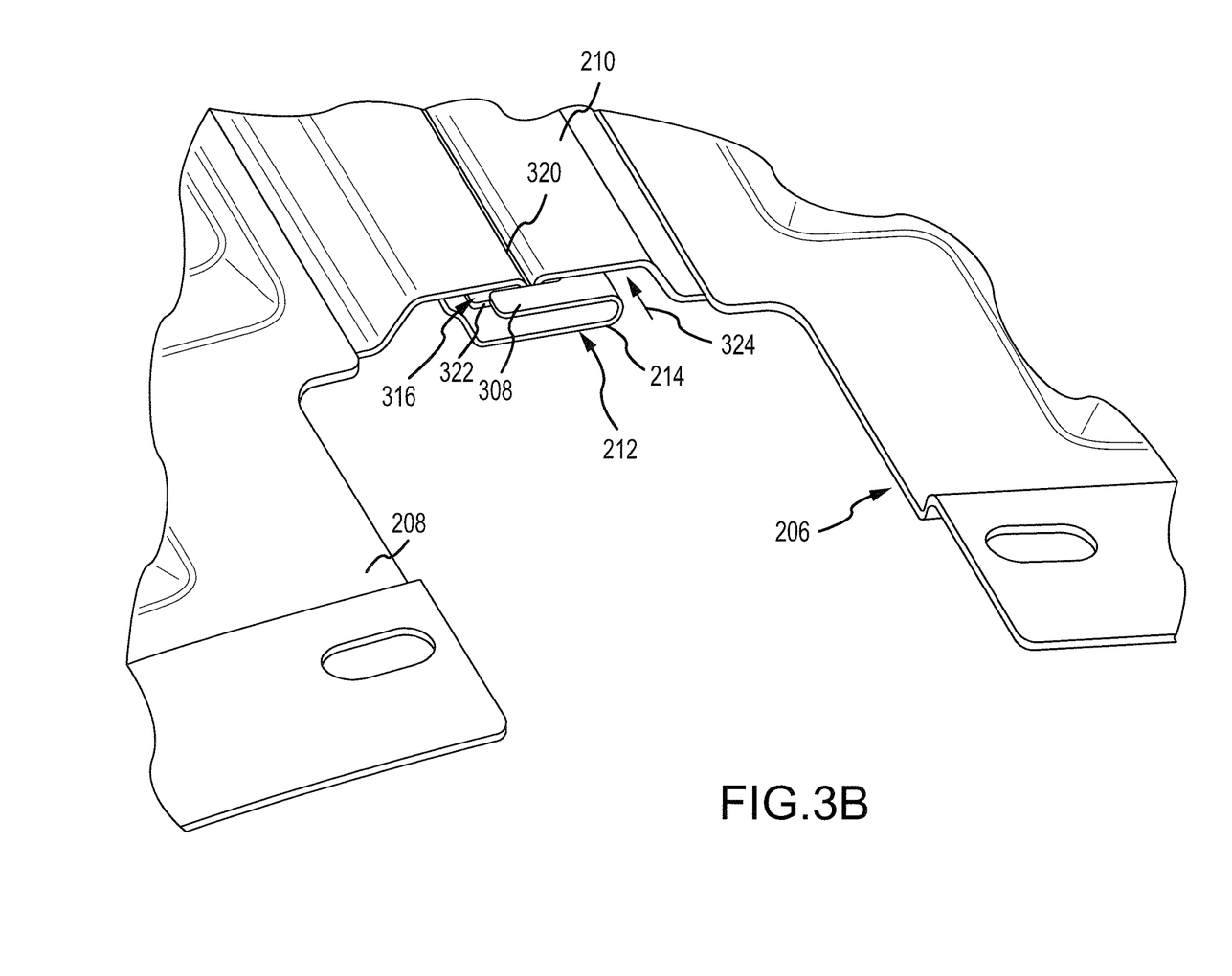
FIG. 3B is a perspective view of the first end of the retaining clip of FIG. 3A attached to a hook feature of the heat shield assembly, in accordance with various embodiments.

Referring now to FIGS. 3A and 3B, the retaining clip 212 may include features that resist migration or movement of the retaining clip 212 relative to the heat shield hooks 210 towards the second end 216 (shown in FIG. 2B; i.e., in the outboard direction). As shown, the retaining clip 212 includes a first side 300 and a second side 302. The first side 300 and the second side 302 may include a curvature 304 that may cause the first side 300 and the second side 302 to have a U-shaped cross section. That is, the curvature 304 may cause an outer edge 306 of each of the first side 300 and the second side 302 to extend back towards the longitudinal axis A-A', potentially resembling a U-shaped hook-like cross section.

In that regard, each of the first side 300 and the second side 302 may include a base portion 310 and an outer portion 312. The outer portion 312 may be parallel to the base portion 310, and the outer edge 306 may be formed at the ends of the outer portion 312. A gap 318 may exist between the outer edges 306 of the first side 300 and the second side 302.

The retaining clip 212 may further include a migration stop 308 defined by the first side 300 at the first end 214. The migration stop 308 may resist outboard migration of the retaining clip 212 relative to the heat shield hooks 210. A curved slot 314 may exist between the outer edge 306 of the first side 300 and the migration stop 308. The migration stop 308 may extend beyond the outer edge 306 of the second side 302 in a direction towards the second side 302.

The heat shield hooks 210 may have a pair of U-shaped hooks 316 with a gap 320 existing therebetween. The first side 300 and the second side 302 are each designed to receive an end of the U-shaped hooks 316 of the heat shield hooks 210 between the base portion 310 and the outer portion 312. Due to the coupling of the heat shield hooks 210 (whether integral or non-integral construction) to the heat shield 208, and the interface between the U-shaped hooks 316 and the retaining clip 212, the heat shield 208 may be fully annular without any breaks or disturbances in the annular shape. Similarly, the coupling of the heat shield hooks 210 (again, whether integral or non-integral construction) to the heat shield 208 and the interface between the U-shaped hooks 316 and the retaining clip 212 may resist expansion of a diameter of the heat shield assembly The migration stop 308 is designed to interface with ends 322 of the U-shaped hooks 316. This interface resists movement of the retaining clip 212 relative to the heat shield hooks 210 in the outboard direction (as shown by an arrow 324).

Figure 4A:
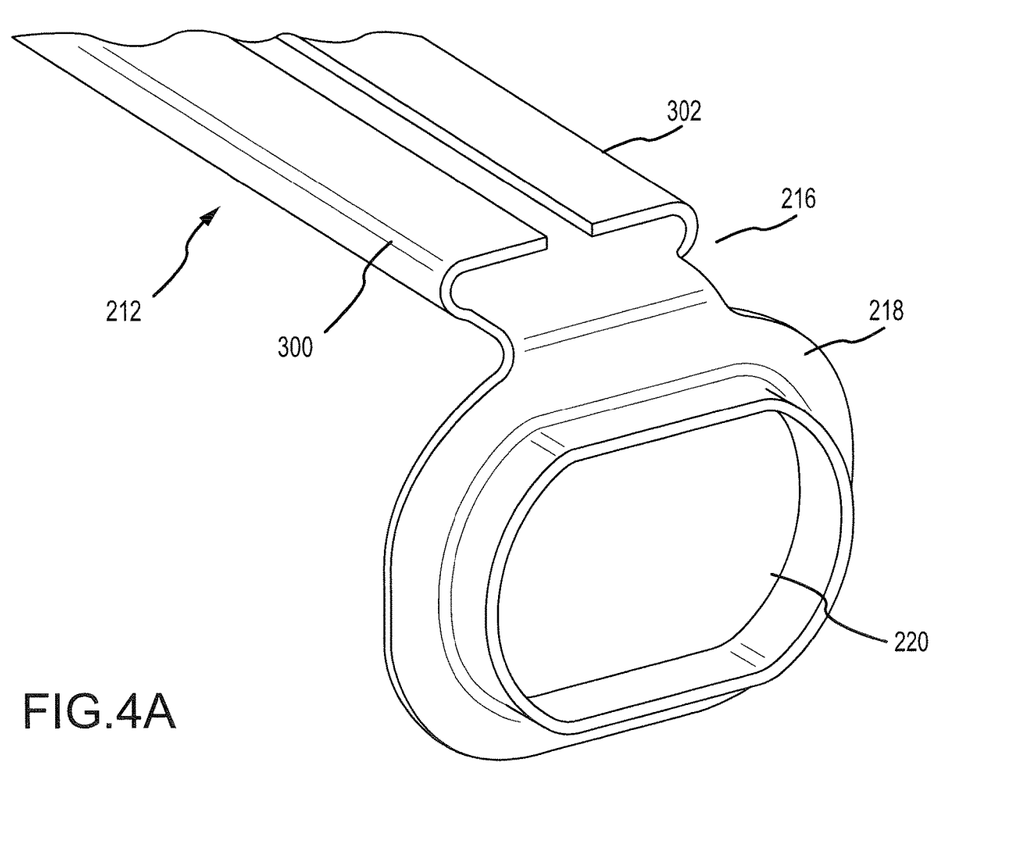
FIG. 4A is a perspective view of a second end of the retaining clip of FIG. 3A, in accordance with various embodiments.
Figure 4B:
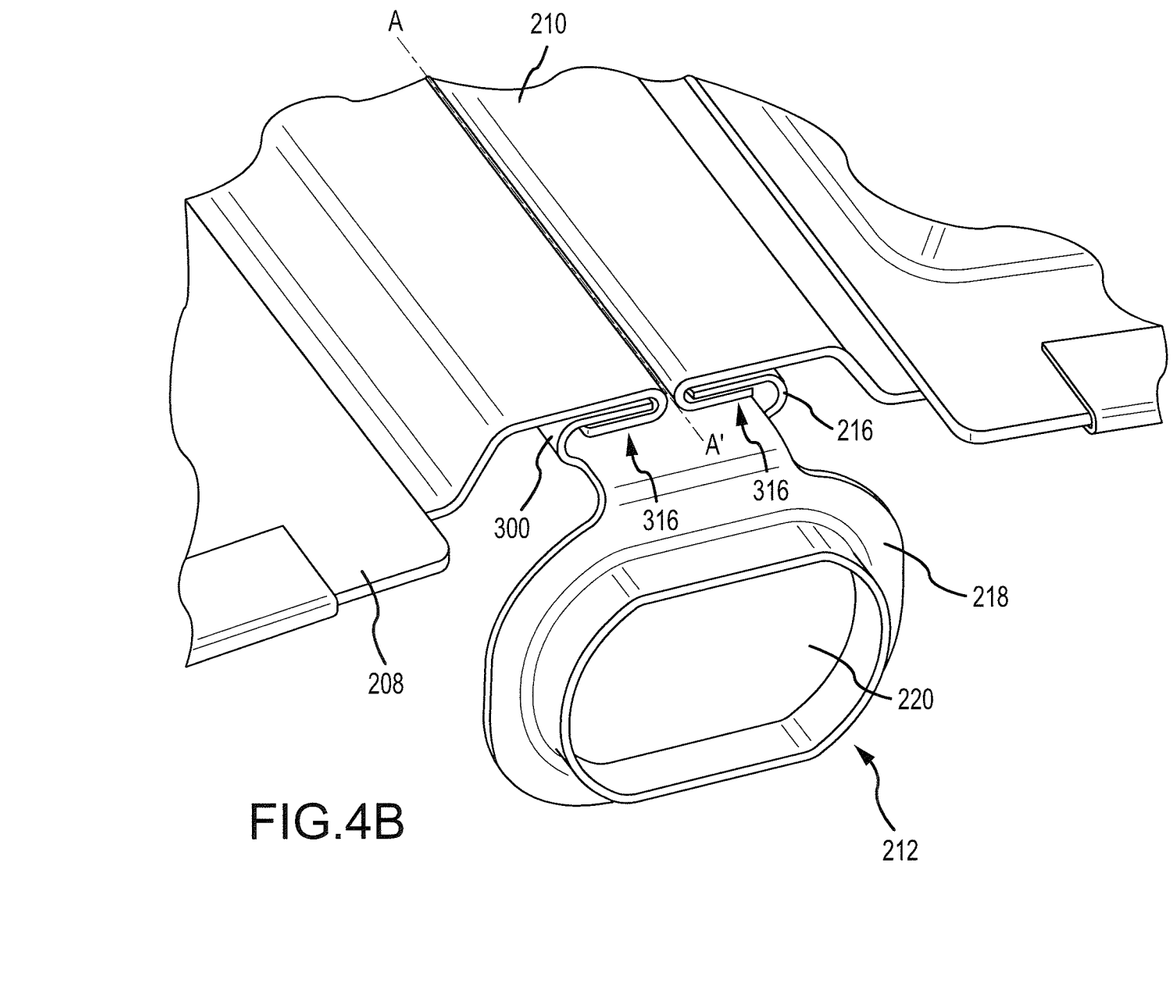
FIG. 4B is a perspective view of the second end of the retaining clip of FIG. 4A attached to the hook features of the heat shield of FIG. 3B, in accordance with various embodiments.

Turning now to FIGS. 4A and 4B, the second end 216 of the retaining clip 212 is shown. As shown, the first side 300 and the second side 302 of the retaining clip 212 interfaces with the U-shaped hooks 316. Additionally, the tab 218 extends substantially perpendicular to the axis A-A' and defines the aperture 220.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A retaining clip for constraining a heat shield for use with an aircraft wheel assembly, the retaining clip comprising:
   a first end and a second end axially opposite the first end, the first end being opposite the second end along a longitudinal axis;
   a first side and a second side each having a curvature forming a U-shaped cross section such that an outer edge of each of the first side and the second side extends back towards the longitudinal axis;
   a migration stop defined by the first side at the first end, the migration stop extending past the outer edge of the second side and configured to interface with hooks of the heat shield to resist axial movement of the retaining clip relative to the heat shield; and a tab extending from the second end at a direction perpendicular to the longitudinal axis, the tab defining an aperture for receiving a portion of a torque bar.

2. The retaining clip of claim 1, wherein the first end is an inboard end and the second end is an outboard end such that the migration stop resists axial movement of the retaining clip relative to the heat shield towards the outboard end.

3. The retaining clip of claim 2, wherein interaction between the tab and the portion of the torque bar resists axial movement of the retaining clip relative to the heat shield towards the inboard end.

4. The retaining clip of claim 3, wherein the interaction between the tab and the portion of the torque bar as well as the interface between the migration stop and the retaining clip is sufficient to resist axial movement of the retaining clip towards the inboard end and towards the outboard end during normal operation of the aircraft wheel assembly.

5. The retaining clip of claim 1, wherein:
the aircraft wheel assembly has a wheel axis that is parallel to the longitudinal axis of the retaining clip;
the curvature of the first side and the second side extends radially outward relative to the wheel axis; and
the tab extends radially inward relative to the wheel axis.

6. The retaining clip of claim 1, wherein the first side and the second side each have a base portion and an outer portion that includes the outer edge, wherein the outer portion is parallel to the base portion.

7. The retaining clip of claim 6, wherein the migration stop is defined by the outer portion of the first side, and the outer portion of the first side further defines a curved slot located between the outer edge of the first side and the migration stop.

8. The retaining clip of claim 6, wherein the first side and the second side are each configured to receive U-shaped hooks of the retaining clip between the base portion and the outer portion.

9. A retaining clip for constraining a heat shield for use with an aircraft wheel assembly, the retaining clip comprising:
a first end and a second end axially opposite the first end, the first end being opposite the second end along a longitudinal axis;
a first side and a second side each having a curvature forming a U-shaped cross section such that an outer edge of each of the first side and the second side extends back towards the longitudinal axis;
a migration stop defined by the first side at the first end, the migration stop extending past the outer edge of the second side and configured to interface with the heat shield to resist axial movement of the retaining clip relative to the heat shield towards the second end; and
a tab extending from the second end at a direction perpendicular to the longitudinal axis, the tab defining an aperture for receiving a portion of a torque bar such that interaction between the tab and the torque bar resists axial movement of the retaining clip relative to the heat shield towards the first end.

10. The retaining clip of claim 9, wherein the first end is an inboard end and the second end is an outboard end.

11. The retaining clip of claim 10, wherein the interaction between the aperture and the portion of the torque bar as well as the interface between the migration stop and the heat shield is sufficient to resist axial movement of the retaining clip towards the inboard end and towards the outboard end during normal operation of the aircraft wheel assembly.

12. The retaining clip of claim 9, wherein:
the aircraft wheel assembly has a wheel axis that is parallel to the longitudinal axis of the retaining clip;
the curvature of the first side and the second side extends radially outward relative to the wheel axis; and
the tab extends radially inward relative to the wheel axis.

13. The retaining clip of claim 9, wherein the first side and the second side each have a base portion and an outer portion that includes the outer edge, wherein the outer portion is parallel to the base portion.

14. The retaining clip of claim 13, wherein the migration stop is defined by the outer portion of the first side, and the outer portion of the first side further defines a curved slot located between the outer edge of the first side and the migration stop.

15. The retaining clip of claim 13, wherein the first side and the second side are each configured to receive U-shaped hooks of the heat shield between the base portion and the outer portion.

16. A heat shield assembly for use with an aircraft wheel, the heat shield assembly comprising:
a heat shield;
two detail components coupled to the heat shield and having a pair of U-shaped hooks; and
a retaining clip having:
a first end and a second end axially opposite the first end, the first end being opposite the second end along a longitudinal axis;
a first side and a second side each having a curvature forming a U-shaped cross section such that an outer edge of each of the first side and the second side extends back towards the longitudinal axis, the first side and the second side interfacing with the pair of U-shaped hooks of the two detail components; and
a migration stop defined by the first side at the first end, the migration stop extending past the outer edge of the second side and configured to interface with the pair of U-shaped hooks to resist axial movement of the retaining clip relative to the heat shield.

17. The heat shield assembly of claim 16, wherein the retaining clip further includes a tab extending from the second end at a direction perpendicular to the longitudinal axis, the tab defining an aperture for receiving a portion of a torque bar.

18. The heat shield assembly of claim 17, wherein the first end is an inboard end and the second end is an outboard end such that the migration stop resists axial movement of the retaining clip relative to the heat shield towards the outboard end.

19. The heat shield assembly of claim 18, wherein interaction between the aperture and the portion of the torque bar resists axial movement of the retaining clip relative to the heat shield towards the inboard end.

* * * * *